United States Patent [19]

Schwarz

[11] Patent Number: 5,331,493
[45] Date of Patent: Jul. 19, 1994

[54] BIDIRECTIONAL THIN-FILM MAGNETORESISTIVE TAPE HEAD ASSEMBLY

[75] Inventor: Theodore A. Schwarz, Woodbury, Minn.

[73] Assignee: Minnesota Mining and Manufacturing Company, St. Paul, Minn.

[21] Appl. No.: 933,383

[22] Filed: Aug. 21, 1992

[51] Int. Cl.$^5$ .................... G11B 5/127; G11B 5/265
[52] U.S. Cl. .................................................. 360/113
[58] Field of Search .................. 360/113, 119–122, 360/126–128

[56] References Cited

U.S. PATENT DOCUMENTS

| | | | |
|---|---|---|---|
| 3,881,190 | 4/1975 | Brock et al. | 360/113 X |
| 3,887,945 | 6/1975 | Nepela et al. | 360/113 |
| 3,967,368 | 7/1976 | Brock et al. | 29/603 |
| 4,255,772 | 3/1981 | Perez et al. | 360/113 |
| 4,277,540 | 7/1981 | Aine | 428/627 |
| 4,302,790 | 11/1981 | Lemke | 360/119 |
| 4,639,808 | 1/1987 | Thornley | 360/121 |
| 4,685,005 | 8/1987 | Fields, Jr. | 360/121 X |
| 4,797,767 | 1/1989 | Baus, Jr. | 360/121 |
| 4,928,188 | 5/1990 | Brock | 360/113 |
| 4,967,300 | 10/1990 | Reid et al. | 360/122 |
| 5,027,245 | 6/1991 | Nagata et al. | 360/121 |
| 5,034,838 | 7/1991 | Brock et al. | 360/122 |
| 5,050,027 | 9/1991 | Meunier et al. | 360/122 |
| 5,055,318 | 10/1991 | Deutchman et al. | 427/38 |
| 5,055,957 | 10/1991 | Daughenbaugh et al. | 360/122 X |
| 5,079,831 | 1/1992 | Reid | 29/603 |
| 5,153,980 | 10/1992 | Kira | 29/603 |
| 5,161,299 | 11/1992 | Denison et al. | 360/113 X |
| 5,208,714 | 5/1993 | Denison et al. | 360/113 |
| 5,210,667 | 5/1993 | Zammit | 360/113 |
| 5,212,611 | 5/1993 | Dee | 360/113 |
| 5,212,680 | 5/1993 | Toupin | 360/88 |
| 5,218,498 | 6/1993 | Jagielinski | 360/121 X |

FOREIGN PATENT DOCUMENTS 58-212614 12/1983 Japan.
59-210520 11/1984 Japan.

OTHER PUBLICATIONS

Mee, C. Denis and Daniel, Eric D., editors, *Magnetic Recording Handbook*, (New York: McGraw Hill Publishing Co. 1989) pp. 290–295 and p. 940.

Romankiw, Lubomyr T. and Dean A. Herman, Jr., editors, "Proceedings of the Symposium on Magnetic Materials, Processes, and Devices," Electrodeposition Division, Proceedings vol. 90-8 (Pennington, N.J.: The Electrochemical Society, Inc. 1990), pp. 185–204.

"A High Capacity, High Performance, Small Form Factor Magnetic Tape Storage System," Doyle et al., *IEEE Transactions on Magnetics*, vol. 26, No. 5, Sep. 1990, pp. 2152–2156.

*Primary Examiner*—John H. Wolff
*Attorney, Agent, or Firm*—Gary L. Griswold; Walter N. Kirn; Eric D. Levinson

[57] ABSTRACT

A bidirectional thin-film magnetoresistive tape head assembly. The invention minimizes wear on the head assembly by: (1) minimizing the distance between the read elements and their respective write elements, (2) forming the head assembly from hard materials, and (3) placing a hard block between the read and write elements. The head assembly uses only a single pair of read and write elements per data track, but the pairs are reversed with respect to each other so that the head assembly is capable of reading-while-writing on the tape in both directions.

9 Claims, 6 Drawing Sheets

BIDIRECTIONAL THIN-FILM MAGNETORESISTIVE TAPE HEAD ASSEMBLY

FIELD OF THE INVENTION

The present invention concerns an improved thin-film magnetoresistive tape head assembly.

BACKGROUND OF THE INVENTION

In current, state of the art magnetic tape recorders adapted for computer data storage, a read-while-write capability is an essential feature for providing virtually error free magnetically stored data. A read-while-write head assembly comprises a write element in-line with a read element, the gap of the read element being closely spaced to the gap of the write element, with the read element positioned downstream of the write element in the direction of tape motion. By continually reading "just recorded" data, the quality of the recorded data is immediately determinable at a time when the original data is still available in temporary storage in the recording system. The reproduced data is checked against the original data, and appropriate action, such as re-recording, may be taken in case of error.

Many modern tape recording systems require operation where writing and reading of the data occurs for either direction of tape travel. The streaming tape system where the recording is laid down on the tape in a serpentine pattern for alternate directions of tape travel is an example of such a bidirectional recording system. Incorporation of read-while-writing capability for bidirectional operation has traditionally necessitated a head assembly consisting of three heads: a first write element adjacent to a read element which is adjacent to a second write element, or a first read element adjacent to a write element which is adjacent to a second read element. See, for example, U.S. Pat. No. 5,034,838 (Brock).

The quantity of data stored on a magnetic tape may be increased by increasing the number of data tracks on the tape, thereby decreasing the distance between the centerlines of adjacent tracks. Tape heads which are suitable for reading and writing on such tapes require a high level of precision in the alignment of the read and write elements in the head assembly. This may be achieved by minimizing the distance between each read element and its respective write element. The problem of aligning the read and write elements may also be simplified by eliminating one of the three heads, although, as in the case of the IBM 3480 system, this has traditionally eliminated the capability of bidirectional read-while-write.

Tape heads also suffer from the problem of head wear caused by the magnetic recording tape. Repeated passes of a tape over the tape head will, over time, wear away at the surface of the tape head, which can impair the performance of the head.

It would be desirable to have a tape head assembly which (1) minimizes head wear, (2) minimizes the distance between the read elements and their respective write elements by combining both elements into a single head assembly, (3) requires only a single pair of read and write elements per track (and not two reads and a write or two writes and a read) and (4) has bidirectional read-while-write capability.

SUMMARY OF THE INVENTION

The present invention includes a bidirectional thin-film tape head assembly comprised of two tape heads bonded together. The first tape head is comprised of read and write modules that are bonded together. The read module is comprised of thin-film structures deposited on a substrate, and an insulative layer covering the thin-film structures. The thin-film structures include at least one read element. The write module is similar to the read module, except that it includes at least one write element instead of a read element. The two modules are bonded together so that the read element(s) are aligned with respective write element(s) along a direction of travel of a magnetic tape past the head assembly. This allows the first head to read-while-writing on at least one track in one direction of tape travel.

The second head is identical to the first head, but its orientation is reversed with respect to the first head so that it is capable of reading-while-writing in the opposite direction of the first head. The two heads are bonded together so that the resultant head assembly is capable of bi-directional read-while-write.

In one embodiment, the present invention includes a tape head assembly comprised of a first and second subassembly. The first subassembly includes thin-film structures deposited on a substrate, and an insulative layer covering the thin-film structures. The thin-film structures include read and write element(s). The second subassembly is similar to the first subassembly. The second subassembly is held in fixed position with respect to the first subassembly so that substantially all of the read element(s) on the first subassembly are aligned along a direction of travel of a magnetic tape past the head assembly with respective write element(s) on the second assembly. All of the write element(s) on the first subassembly are similarly aligned with respective read element(s) on the second subassembly. Thus, the head assembly is capable of bidirectional read-while-write of the magnetic tape.

In another embodiment, the present invention includes first and second subassemblies similar to those of the previous embodiment, except that there is at least one more read element than there are write elements on each subassembly. The two subassemblies are held in fixed position with respect to each other so that at least one of the read elements on the first subassembly is aligned along a direction of travel of a magnetic tape past the head assembly with at least one of the read elements of the second subassembly. The remaining read and write elements are aligned as described in the previous embodiment. The alignment of the read elements on the two subassemblies allows the head assembly to follow a servo-track on the tape, while still providing bidirectional read-while-write capability.

In yet another embodiment, the present invention includes a tape head assembly similar to those described above, but also including a hard block having a hardness of at least 800 on the Knoop hardness scale interposed between the two subassemblies. The hard block improves the wear-resistance of the tape head assembly.

In still another embodiment, the present invention includes a tape head comprised of a read and write module bonded together. The read module includes a substrate, a first thin insulating layer, a magnetoresistive sensing layer, at least one conducting layer, a second thin insulating layer, a shield layer, and a thick insulating layer. The write module includes a substrate, a first thin insulating layer, and conducting layer, a second thin insulating layer, a pole layer, and a thick insulating layer. The two modules are bonded together so that the head is capable of reading-while-writing in one direction of tape travel. The substrate can be $Al_2O_3$-TiC, the shield and pole layers can be FeTaN or CoZnNb, and the insulating layers can be diamond-like carbon.

In still yet another embodiment, the present invention includes a method of depositing thin-film structures on a wafer.

The various embodiments of the present invention minimize head wear by: (1) minimizing the distance between read elements and their respective write elements, (2) forming the head assembly from hard materials, and (3) placing a hard block between the read and write elements. The present invention uses only a single pair of read and write elements per data track, but the pairs are reversed with respect to each other so that the head assembly is capable of reading-while-writing on the tape in both directions.

BRIEF DESCRIPTION OF THE DRAWINGS

The novel features and advantages of the present invention will become more apparent to those skilled in the art upon consideration of the following detailed description which refers to the accompanying drawings wherein.

DETAILED DESCRIPTION OF THE PREFERRED EMBODIMENTS

Figure 1:
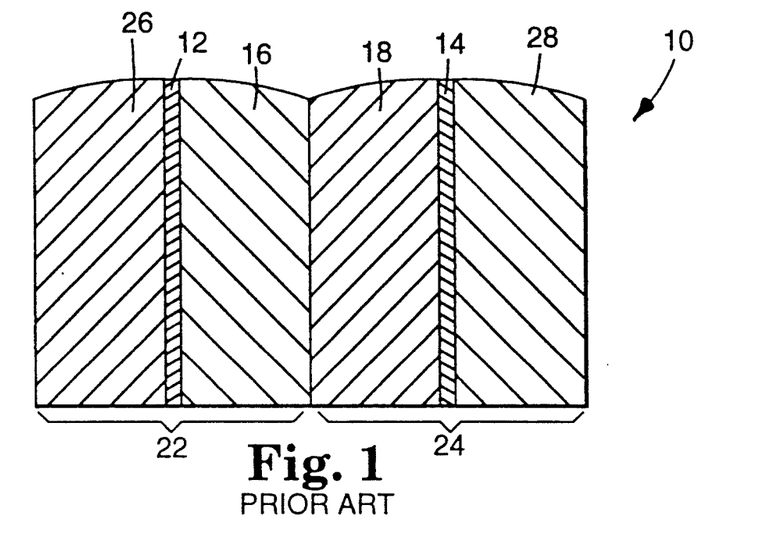
FIG. 1 is a cross-sectional side view of a prior art tape head assembly.

A prior art tape head assembly 10 resembling the IBM 3480 head is shown in FIG. 1. A thin-film magnetoresistive ("MR") read element sandwich 12 is bonded to a ferrite wafer 16. A ferrite closure 26 is bonded to the face of the ferrite wafer 16, bonding the read element sandwich 12 therebetween, to form a read head 22. Also, a thin-film inductive write element sandwich 14 is bonded to a ferrite wafer 18. A ferrite closure 28 is bonded to the face of the ferrite wafer 18, bonding the write element sandwich 14 therebetween, to form a write head 24. The opposite face of the ferrite wafer 18 is then bonded to the face of the ferrite wafer 16 opposite the read element sandwich 12, as shown in FIG. 1, to form the complete assembly. Because the tape head assembly 10 has only two single type heads (the read head 22 and the write head 24), it does not have bidirectional read-while-write capability.

The thin-film read element sandwich 12 is separated from the thin-film write element sandwich 14 by a distance of about 150 mils (3.8 mm). This large separation is disadvantageous for three reasons. First, the large distance increases the probability that the read element sandwich 12 will not be aligned with a given written track on a magnetic tape (not shown) which was written with the thin-film write element sandwich 14 because there is some variation of the location of the path of travel of the magnetic tape with respect to the two heads. This would impair the ability of the head assembly 10 to read-while-writing. Thus, it is advantageous to locate the read sandwich 12 and the write sandwich 14 as close as possible together so as to minimize the distance that the tape can wander. Second, the large distance between the read sandwich 12 and the write sandwich 14 results in increased difficulty in aligning the read and write element during fabrication of the tape head assembly 10. Third, the large distance between the read sandwich 12 and the write sandwich 14 results in increased off-track error due to misalignment of the drive head with respect to the tape track centerline.

Figure 2:
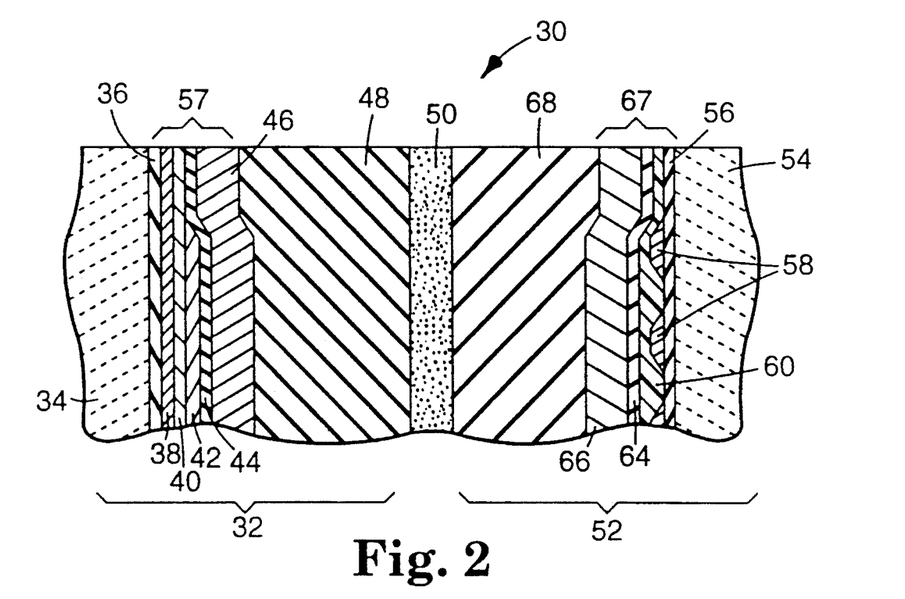
FIG. 2 is a cross-sectional side view of the tip of a tape head according to one embodiment of the present invention.

A side cross-sectional view of the tip of a single head 30 according to the present invention is shown in FIG. 2. The head 30 is comprised of a read module 32 and a write module 52. A magnetic tape (not shown) would move across the top of the tape head 30 from right to left to read-while-writing. The read module 32 is comprised of a substrate 34, thin-film structures 57, and a thick insulating layer 48. The thin-film structures 57 are comprised of a first thin insulating layer 36, a magnetoresistive (MR) sensing layer 38, a first conducting layer 40, a second conducting layer 42, a second thin insulating layer 44, and a shield layer 46.

The substrate 34 can include either magnetic or non-magnetic ceramics. Preferred magnetic ceramics are those which have a low coercivity, high magnetic moment, and high magnetic permeability, such as NiZn (ferrite). If, however, the substrate 34 includes a non-magnetic ceramic, the substrate must also include a magnetic layer (not shown) located between the ceramic layer and the first thin insulating layer 36. This magnetic layer can be made from NiFe (permalloy), cobalt zirconium niobium (CZN), cobalt zirconium tantalum (CZT), or AlFeSi. Preferable non-magnetic ceramics include $Al_2O_3$-TiC, which has a hardness of about 1800 on the Knoop hardness scale. A preferred $Al_2O_3$-TiC ceramic is 3M Ceramic 210 available from 3M Company in St. Paul, Minn., which has a titanium carbide particle loading of about 30% by weight.

The substrate 34 serves as a lower or first magnetic shield for the MR sensing layer 38. This shield prevents magnetic flux from adjacent transitions in the magnetic tape in close proximity to those portions of the tape being detected from reaching the MR sensing layer 38 and contaminating the signal from the tape.

The three insulating layers 36, 44, and 48 are preferably non-magnetic and non-conductive. The three insulating layers 36, 44, and 48 can be made of aluminum oxide, $Al_2O_3$. Preferably, however, the three insulating layers 36, 44, and 48 are made of diamond-like carbon, specifically amorphous hydrogenated carbon (a-C:H). Diamond-like carbon is an amorphous form of carbon having a high degree of $sp^3$ bonding, so that the carbon material exhibits many of the physical characteristics of a diamond. Other materials may be used, such as amorphous carbon (a-C), ion beam-deposited carbon (i-C), diamond or amorphous diamond. Depending on the particular construct of the read module 32, the first and second thin insulating layers 36 and 44 can range in thickness from 0.05 to 0.5 μm. The thick insulating layer 48 is preferably much thicker than the first and second thin insulating layers 36 and 44 so that it may be processed for flatness, and can range from 0.2 μm to several hundred micrometers in thickness.

The MR sensing layer 38 provides a signal by changing resistance when the magnetic field generated by the signal in the magnetic tape changes. The MR sensing layer 38 is preferably made of NiFe (permalloy) having a composition of about 80% nickel and 20% iron.

The shield layer 46 is preferably made from a magnetic material having a low coercivity and a high magnetic saturation moment. The shield layer 46 is preferably about 2-6 μm thick and can be made of NiFe (permalloy), which as a hardness of less than 500 on the Knoop hardness scale. Preferably, however, the shield layer 46 is made from harder substances, such as FeTaN or CoZnNb, which each have a hardness of about 600-900 on the Knoop scale.

The first conducting layer 40 is preferably 0.04 to 0.10 μm thick and should be made from a conductor having a high resistance, such as titanium, tantalum, niobium, or chromium. The current flowing through the first conducting layer 40 provides a magnetic bias field which causes the MR sensing layer 38 to operate in its most linear range. The second conducting layer 42 is preferably about 0.1 to 0.3 μm thick and should be made from a conductor having a low resistance, such as gold, copper, or aluminum. The second conducting layer 42 provides a low resistance path between the sensing portion of the layers 38 and 40 and termination pads (not shown). The second conducting layer 42 does not extend upward to the magnetic tape-contacting surface of single head 30.

As shown in FIG. 2, the write module 52 is comprised of a substrate 54, thin-film structures 67, and a thick insulating layer 68. The thin-film structures 67 are comprised of a first thin insulating layer 56, a conducting layer 58, an optional smoothing layer 60, a second thin insulating layer 64, and a pole layer 66. The substrate 54 is preferably made from the same materials as the substrate 34 in the read module 32. The substrate 54 serves as a lower or first magnetic pole for the write module 52.

The first and second thin insulating layers 56 and 64 are preferably made from the same materials as the first and second thin insulating layers 36 and 44 in the read module 32. The thick insulating layer 68 is preferably made from the same material as the thick insulating layer 48 in the read module 32 and, like the thick insulating layer 48, is preferably much thicker than the first and second thin insulating layers 36 and 44 so that it may be processed for flatness.

The conducting layer 58 is comprised of write coils which can be made from the same material as the second conducting layer 42 in the read module 32. The smoothing layer 60 is preferably photoresist. The pole layer 66 conducts and focuses the magnetic field from the write coils to write on the magnetic media (e.g., tape or disc). The pole layer 66 is preferably made from the same material as the shield layer 46 in the read module 32. All or some of the above layers can be patterned in a direction transverse to the cross-section shown in FIG. 2.

The thick insulating layer 48 of the read module 32 is bonded by an epoxy layer 50 to the thick insulating layer 68 of the write module 52. The epoxy layer 50 should be made as thin as possible.

Figure 3:
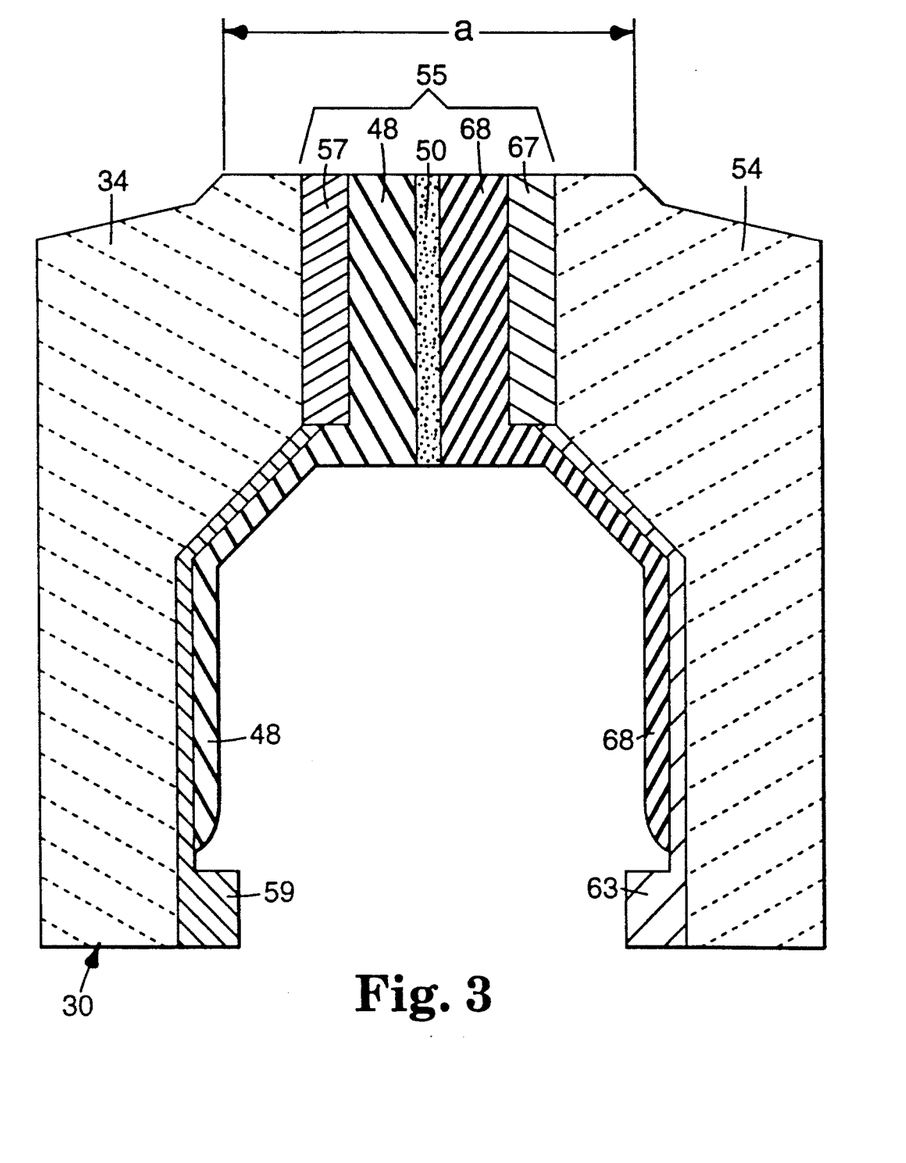
FIG. 3 is a cross-sectional view of a tape head according to one embodiment of the present invention.

The second conducting layer 42 of the read module 32 and the conducting layer 58 (e.g., the write coils) of the write module 52 are electrically connected to leads 59 and 63, respectively, as shown in FIG. 3. The horizontal portion a of the top of head 30 ranges in width from about 5 mils to 20 mils (0.1 mm–0.5 mm). The read module 32 is separated from the write module 52 by about 2 to 10 mils (0.05–0.25 mm). Thus, the distance between the read and write modules is reduced by a factor of about 15 to 75 from the prior art shown in FIG. 1 (2-10 mils vs. 150 mils).

The shape of the top of the head 30 shown in FIG. 3 allows a magnetic tape (not shown) passing over it to conform more closely to the read module 32 and the write module 52, thus decreasing tape-head separation. The horizontal portion of the top of the head need not be more than a few mils wide or higher than the remainder of the substrates 34 and 54 to achieve its purpose.

The portion of the tape head 30 shown in FIG. 2 is represented by the bracket 55 shown in FIG. 3. FIG. 3 shows the entirety of the substrates 34 and 54 of the head 30. The layers 36-46 of the read module 32 are shown collectively as thin-film structures 57. The layers 56-66 of the write module 52 are shown collectively as thin-film structures 67. The electrical leads 59 and 63 are deposited on the substrates 34 and 54, respectively. The leads 59 are electrically connected to the second conducting layer 42 in the read module 32, and the leads 63 are electrically connected to the conducting layer 58 (e.g. the write coils) of the write module 52. The substrates 34 and 54 are configured so that the leads 59 and 63 are separated from each other so that clearance is provided to attach flex cables (not shown) to the leads 59 and 63 without touching each other. The thick insulating layer 48 of the read module 32 covers all of the lead 59, as shown in FIG. 3. Similarly, the thick insulating layer 68 of the write module 52 covers the lead 63.

A head 30 according to the present invention is constructed as follows: The layers 36-48 are sequentially deposited on the substrate 34. Then the layers 56-68 are sequentially deposited on the substrate 34. Flex leads are attached to each module. The read and write modules 32 and 52 are then assembled together by bonding the thick insulating layer 48 to the thick insulating layer 68 with epoxy 50.

Figure 4A:
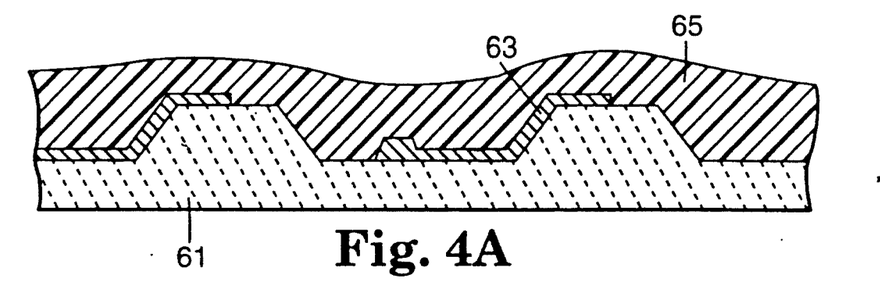
FIGS. 4A-4D are cross-sectional side views of thin-film structures on a wafer according to one embodiment of the present invention.

FIGS. 4A–4D show a method for depositing a thin-film structure on a substrate. The method will be demonstrated with regard to write module 52, although the identical method can be used to make a read module 32. First, a plurality of relief slots 10-15 mils (0.2–0.3 mm) deep are etched or machined into a wafer to allow the attachment of flexible cables. This provides a plurality of raised ridges. A cross-section of a wafer 61 is shown in FIG. 4A. The wafer 61 can be made of the same materials as the substrate 54. Hundreds of substrates similar to the substrate 54 can be cut from the single wafer 61.

Thick large geometry conductors or leads 63 are then deposited on the etched surface of the wafer 61 by typical masking and deposition techniques. A smoothing layer 65, which is typically photoresist, is applied to the wafer 61, thereby filling the relief slots in the wafer as shown in FIG. 4A.

Figure 4B:
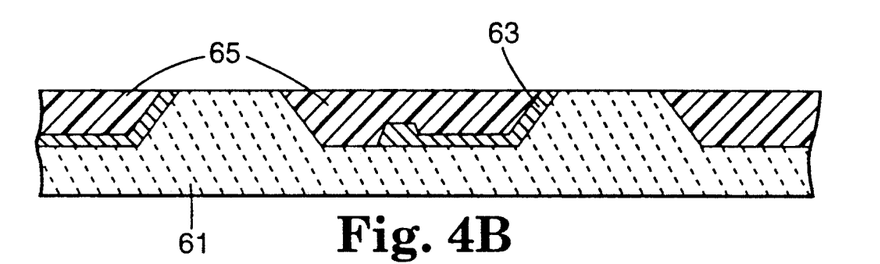
Figure 4C:
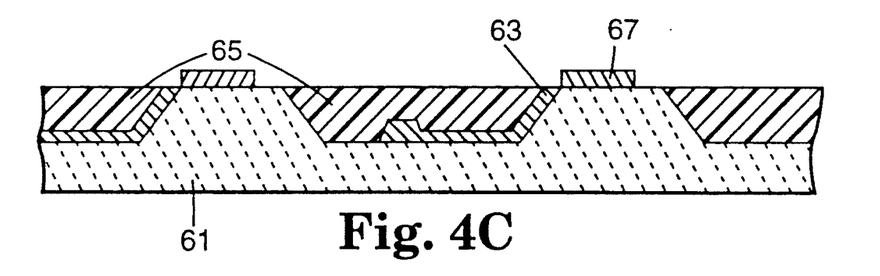
Figure 4D:
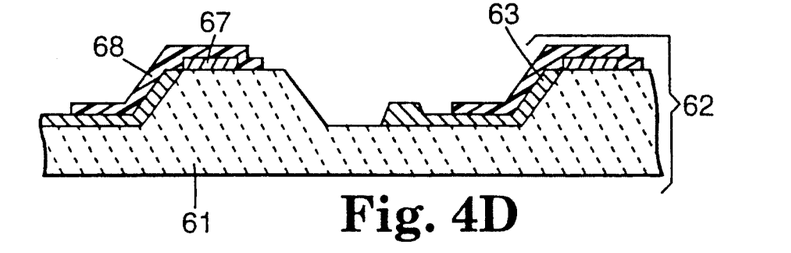

The smoothing layer 65 is then lapped or polished back to the level of the wafer 61, as shown in FIG. 4B, thereby exposing the contacts of the leads 63, and removing that portion of the leads 63 on the ridge of the substrate 61. The thin-film structures 67 are then deposited on the wafer 61 so that they contact the exposed portions of the leads 63, as shown in FIG. 4C. The smoothing layer 65 is washed or etched away and the third insulating layer 68 is deposited on the lead 63 and the thin-film structures 67 to protect them, as shown in FIG. 4D. Thus, an entire write module 52 is shown in the bracket 62.

Figure 5:
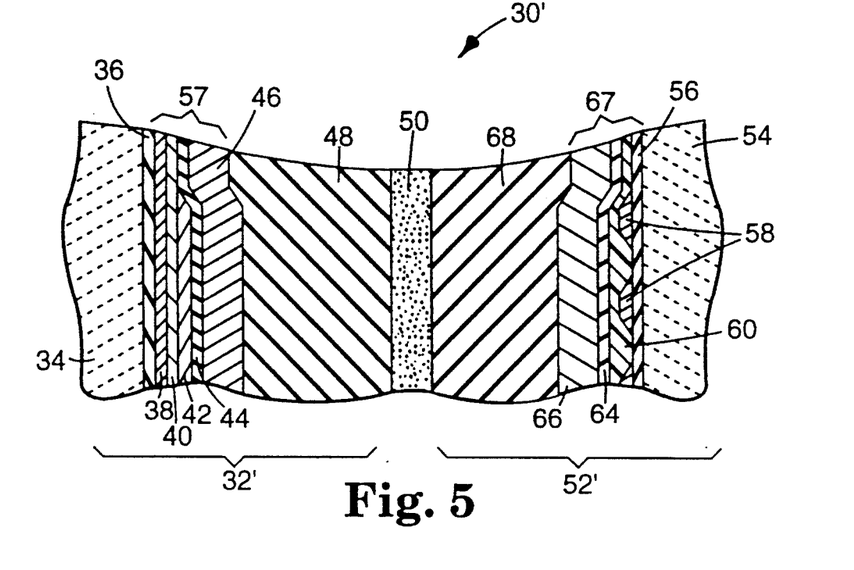
FIG. 5 is a cross-sectional side view of a tape head according to one embodiment of the present invention that has become excessively worn.

All of the above embodiments of the present invention are susceptible to wear of the tape head caused by contact with the magnetic tape (not shown). As shown in FIG. 5, the constant running of magnetic tape over the top of a head 30' for an extended period of time can cause the middle portion of the head between a read module 32' and a write module 52' to wear away.

Figure 6:
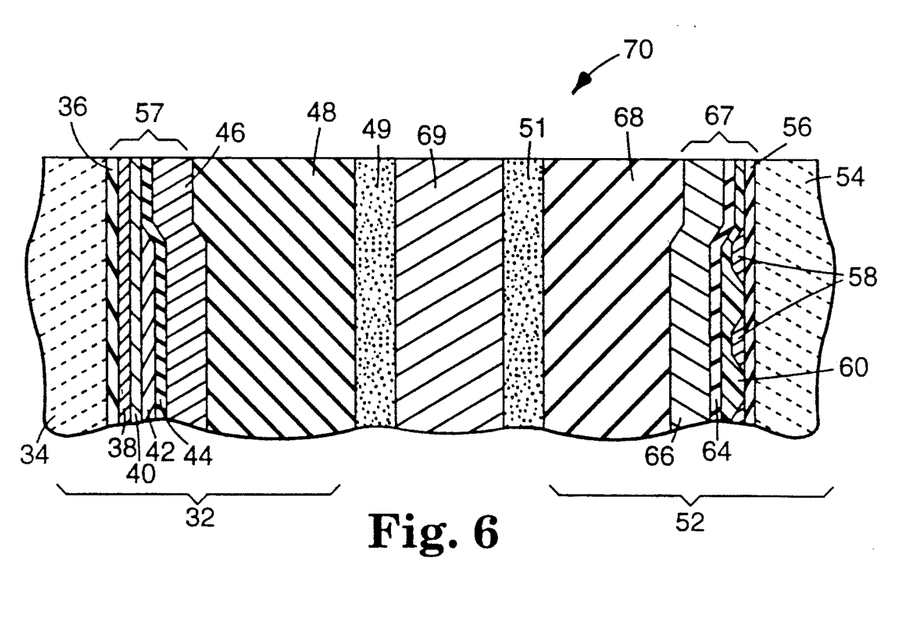
FIG. 6 is a cross-sectional side view of one embodiment for reducing head wear according to the present invention.

FIG. 6 shows a head 70 according to an embodiment of the present invention for reducing head wear. A hard block 69 is located midway between the read module 32 and the write module 52. The block 69 should be highly resistant to wear, and can be the same material as the substrates 34 and 44, e.g. ferrite, which has a Knoop hardness of over 800, or a harder material such as $Al_2O_3$-TiC, which has a Knoop hardness of about 1800. The hard block 69 may be used as an electromagnetic shield for the read elements while writing if it is a magnetic material such as ferrite. The block 69 can be about 5-10 mils (0.13-0.26 mm) thick. The block 69 is located between the thick insulating layers 48 and 68, and is bonded to those layers by epoxy layers 49 and 51, respectively. The presence of the block 69 helps to provide separation between the leads 59 and 63.

Figure 7:
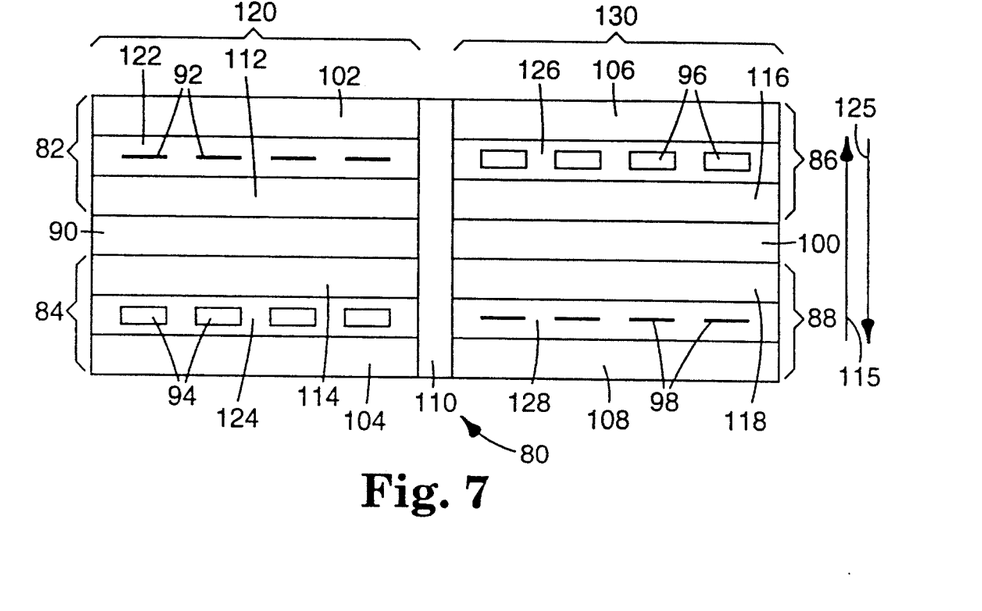
FIGS. 7-9 are representational top views of the read and write elements on tape head assemblies according to various embodiments to the present invention.

FIG. 7 shows a representational top view of a head assembly 80 according to one embodiment of the present invention. The write elements are represented figuratively by rectangular boxes, and the read elements are represented figuratively by straight lines. The head assembly 80 is comprised of heads 120 and 130, which are similar to the head 30, shown in FIGS. 2 and 3. The head 120 is comprised of a read module 82 and a write module 84, which are bonded together by an epoxy layer 90. The read module 82 is comprised of a substrate 102, thin-film structures 122, and a thick layer 112. The thin-film structures 122 contain at least one read element 92. Four read elements 92 are shown in FIG. 7.

The write module 84 is comprised of a substrate 104, thin-film structures 124, and a thick insulating layer 114. The thin-film structures 124 contain at least one write element 94. Four write elements 94 are shown in FIG. 7.

A magnetic tape (not shown) can move across the head 120 in the direction of arrows 115 and 125. Each of the read elements 92 is aligned with a respective write element 94 along the direction of the arrow 115.

Like the head 120, the head 130 is comprised of a write module 86 and a read module 88, which are bonded together by an epoxy layer 100. The write module 86 is comprised of a substrate 106, thin-film structures 126, and a thick insulating layer 116. The thin-film structures 126 contain at least one write element 96. Four write elements 96 are shown in FIG. 7.

The read module 88 is comprised of a substrate 108, thin-film structures 128, and a thick insulating layer 118. The thin-film structures 128 contain at least one read element 98. Four read elements 98 are shown in FIG. 7.

The magnetic tape can move across the head 130 in the direction of arrows 115 and 125. Each of the read elements 98 is aligned with a respective write element 96 along the direction of the arrow 125. The head 120 is bonded to the head 130 by an epoxy layer 110, as shown in FIG. 7.

The head assembly 80 is configured to read and write on eight tracks. The head assembly 80 can read-while-writing on four tracks simultaneously in the direction of arrows 115 or 125. If the magnetic tape is moving across the head assembly 80 in the direction of the arrow 115, then the head assembly can read the data tracks passing over the read elements 92 of the head 120 just after the tracks have been written on by write elements 94 of the same head. If the magnetic tape is moving across the head assembly 80 in the direction of the arrow 125, the head assembly can read the data tracks passing over the read elements 98 of the head 130 just after the tracks have been written on by write element 96 of that head. Any number of read and write elements may be used, so long as there is a read element 92 in the read module 82 aligned along the direction of the arrows 115 or 125 with each write element 94 in the write module 84, and vice versa, and a write element 96 in the write module 86 aligned with a read element 98 in the read module 88, and vice versa.

Figure 8:
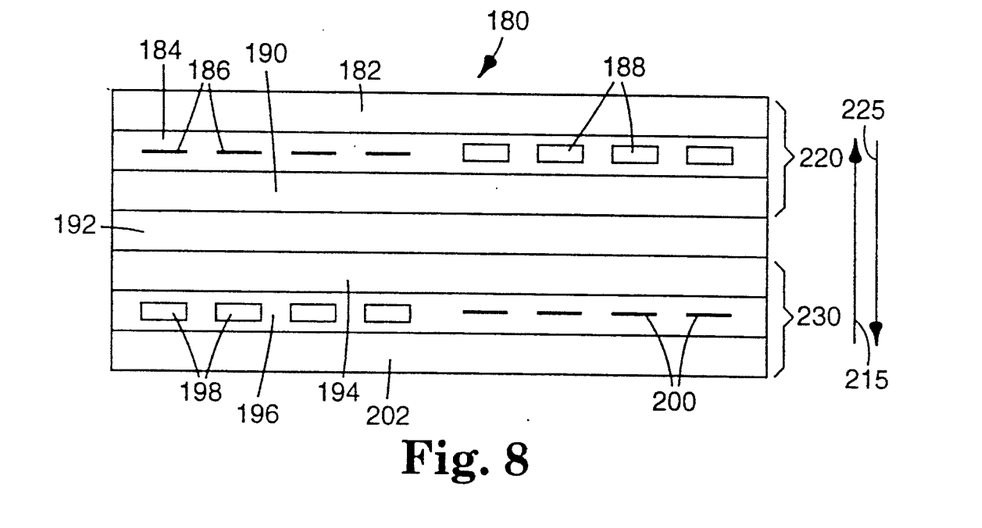

A representational top view of an alternative embodiment of the present invention is shown as head assembly 180 in FIG. 8. The head assembly 180 is comprised of subassemblies 220 and 230, which are bonded together by an epoxy layer 192. The subassembly 220 is comprised of a substrate 182, thin-film structures 184, and a thick insulating layer 190. The thin-film structures 184 include four read elements 186 and four write elements 188.

The subassembly 230 is comprised of a substrate 202, thin-film structures 196, and a thick insulating layer 194. The thin-film structures 196 include four write elements 198 and four read elements 200. A magnetic tape (not shown) can move across the head assembly 80 in the direction of arrows 215 and 225.

Like the head assembly 80, the head assembly 180 is capable of reading-while-writing on eight tracks, and can read-while-writing on four tracks simultaneously in either direction 215 or 225. And like the head assembly 80, any number of read and write elements can be used, so long as there is a read element 186 in the subassembly 220 aligned along the direction of the arrows 215 and 225 with each write element 198 of the subassembly 230, and vice versa, and a write element 188 of the subassembly 220 aligned along the same direction with each read element 200 of the subassembly 230, and vice versa.

Figure 9:
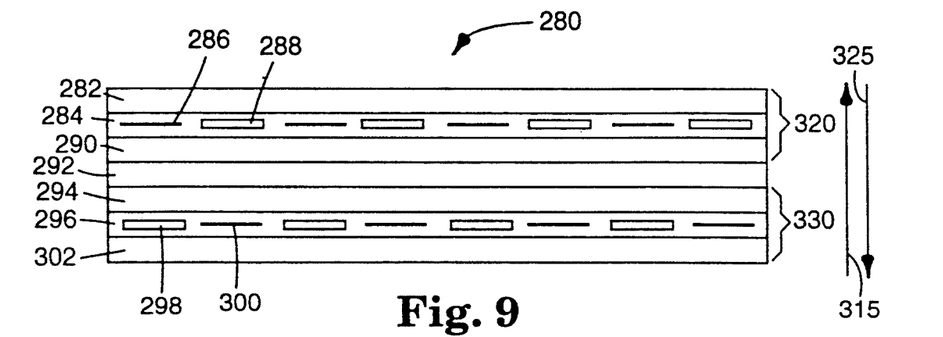

A representational top view of an alternative embodiment of the present invention is shown as head assembly 280 in FIG. 9. The head assembly 280 is comprised of subassemblies 320 and 330, which are bonded together by an epoxy layer 292. The subassembly 320 is comprised of a substrate 282, thin-film structures 284, and a thick insulating layer 290. The thin-film structures 284 include four read elements 286 and four write elements 288, which are configured so that no two read or write elements are adjacent each other.

The subassembly 330 is comprised of a substrate 302, thin-film structures 296, and a thick insulating layer 294. The thin-film structures 296 include four write elements 298 and four read elements 300. A magnetic tape (not shown) can move across the head assembly 280 in the direction of arrows 315 and 325.

Like the head assemblies 80 and 180, the head assembly 280 is capable of reading-while-writing on eight tracks, and can read-while-writing on four tracks simultaneously in either direction, although no two of those four tracks are adjacent each other. And like the head assemblies 80 and 180, any number of read and write elements can be used so long as these are an equal number of read and write elements on the head assembly. Patterns of read and write elements other than those shown above can be used so long as there is a read element 286 in the head assembly 280 aligned with each write element 298, and vice versa, and a write element 288 aligned with each read element 300, and vice versa.

Figure 10:
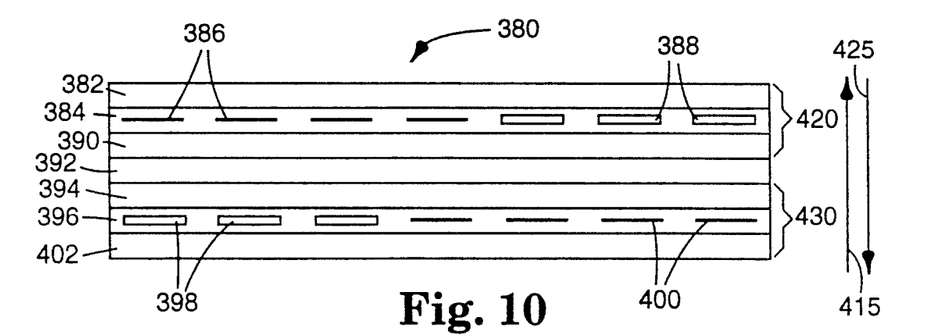
FIG. 10 is a representational top view of the read and write elements on a tape head assembly according to an embodiment of the present invention which follows a servo track.

A representational top view of an alternative embodiment of the present invention is shown as head assembly 380 in FIG. 10. The head assembly 380 is comprised of subassemblies 420 and 430, which are bonded together by an epoxy layer 392. The subassembly 420 is comprised of a substrate 382, thin-film structures 384, and a thick insulating layer 390. The thin-film structures 384 include four read elements 386 and three write elements 388. One of the four read elements 386 is located in the middle of the head assembly 380.

The subassembly 430 is comprised of a substrate 402, thin-film structures 396, and a thick insulating layer 394. The thin-film structures 396 include three write elements 398 and four read elements 400. One of the four read elements 400 is located in the middle of the head assembly 380.

The head assembly 380 is configured to read-while-writing on three tracks simultaneously in the direction of arrows 415 or 425. The read element in the middle of the subassembly 420 is aligned along the direction of the arrows 415 and 425 with the read element in the middle of head 430. This allows the head assembly 380 to follow a servo track on a magnetic tape (not shown) in both directions 415 and 425. Any number of read and write element pairs may be used so long as there is an additional read element on both subassemblies 420 and 430. If it is desirable to be able to follow two servo tracks simultaneously, then a second read element 386 on the subassembly 420 could be aligned along the direction of the arrows 415 or 425 with a second read element 400 on the subassembly 430.

Figure 11:
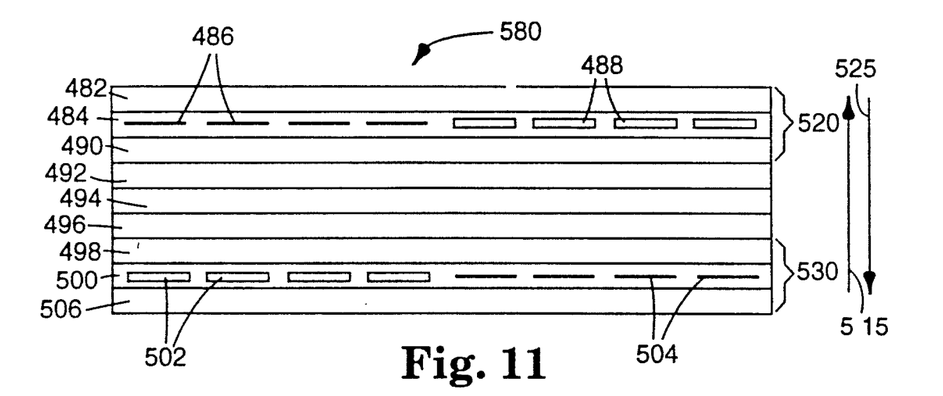
FIG. 11 is a representational top view of the read and write elements on a tape head assembly having a hard block according to the present invention.

A representational top view of a head assembly 580 according to an alternative embodiment of the present invention is shown in FIG. 11. The head assembly 580 is comprised of two subassemblies 520 and 530, which each resemble the subassembly 47 shown in FIG. 6. The subassembly 520 is comprised of a substrate 482, thin-film structures 484, and a thick insulative layer 490. The thin-film structures include read elements 486 and write elements 488.

The subassembly 530 is comprised of a substrate 506, thin-film structures 500, and a thick insulative layer 498. The thin-film structures 500 include write elements 502 and read elements 504.

The subassemblies 520 and 530 are separated by a wear-resistant block 494, which is bonded to subassembly 520 by an epoxy layer 492 and to subassembly 530 by an epoxy layer 496. Although the configuration of read and write elements is identical to the configuration shown in FIG. 8, the read and write elements can also be configured in the ways shown in FIGS. 9 and 10. Similarly, the wear-resistant block 494 could also be included in the head assembly 80 of FIG. 7 by placing one wear-resistant block between the read module 82 and the write module 84 in the subassembly 120, and by placing another block between the read module 86 and the write module 88 in the subassembly 130.

Although the present invention has been described with reference to the preferred embodiments, workers skilled in the art will recognize that changes may be made in form and detail without departing from the spirit and scope of the invention.

I claim:

1. A thin-film magnetoresistive tape head including:
a read module comprised of a first stack of layers, including, in order, a substrate, a first thin insulating layer, a magnetoresistive (MR) sensing layer, at least one conducting layer, a second thin insulating layer, a shield layer, and a thick insulating layer;
a write module comprised of a second stack of layers, including, in order, a substrate, a first thin insulating layer, a conducting layer, a second thin insulating layer, a pole layer, and a thick insulating layer; and
a bonding layer interposed between the thick insulating layer of the read module and the thick insulating layer of the write module whereby the read and write modules are aligned along a direction of travel of a magnetic tape past the tape head and wherein the read and write modules are bonded to each other.

2. The tape head of claim 1, wherein the tape head is a first tape head, and further including a second tape head, identical to the first head, and a means for bonding the second head to the first head in a reversed orientation with respect to said direction, thereby forming a head assembly that is capable of bidirectional read-after write of the tape.

3. The tape head of claim 1, wherein the bonding layer includes a wear resistant block.

4. The tape head of claim 1, wherein the read module includes a first plurality of read elements, and the write module includes a first plurality of write elements, wherein all of the read elements are aligned along said direction with a respective write element, whereby the head is capable of reading-after-writing.

5. The tape head of claim 1, wherein the substrates comprise $Al_2O_3$-TiC.

6. The tape head of claim 1, wherein the shield layer comprises FeTaN or CoZnNb.

7. The tape head of claim 1, wherein the pole layer comprises FeTaN or CoZnNb.

8. The tape head of claim 1, wherein the insulating layers comprise diamond-like carbon.

9. The tape head of claim 1, wherein the write module further includes a smoothing layer interposed between the conducting layer and the second thin insulating layer.

* * * * *